(12) United States Patent
Anderson

(10) Patent No.: US 7,350,411 B2
(45) Date of Patent: Apr. 1, 2008

(54) HUNTING WIND SENSOR

(76) Inventor: Christopher P. Anderson, 900 Woodburn Dr., Brentwood, TN (US) 37027

( * ) Notice: Subject to any disclaimer, the term of this patent is extended or adjusted under 35 U.S.C. 154(b) by 0 days.

(21) Appl. No.: 11/345,798

(22) Filed: Feb. 2, 2006

(65) Prior Publication Data

US 2007/0186641 A1    Aug. 16, 2007

(51) Int. Cl.
    G01W 1/00    (2006.01)
(52) U.S. Cl. .............................. 73/170.01; 73/170.05; 428/364; 428/394
(58) Field of Classification Search . 73/170.01–170.15
    See application file for complete search history.

(56) References Cited

U.S. PATENT DOCUMENTS

| | | |
|---|---|---|
| 4,423,626 A | 1/1984 | Herschede |
| 5,186,118 A | 2/1993 | Stinson |
| 5,291,778 A | 3/1994 | Dexheimer et al. |
| 5,595,137 A | 1/1997 | Delmonte |
| 5,958,585 A | 9/1999 | Meeks |
| 6,308,716 B1 * | 10/2001 | Han .............................. 132/53 |
| 6,550,418 B2 | 4/2003 | Williamson |
| 6,631,800 B1 | 10/2003 | Keeven |
| 6,769,950 B1 * | 8/2004 | Suciu .......................... 446/176 |
| 6,779,330 B1 * | 8/2004 | Andrews et al. ............... 57/210 |
| 6,848,302 B1 | 2/2005 | Williamson |
| 7,074,499 B2 * | 7/2006 | Schnurer et al. ............ 428/690 |
| 7,140,245 B2 * | 11/2006 | Thomas ................... 73/170.01 |
| 7,193,029 B2 * | 3/2007 | Hayes ......................... 528/293 |
| 7,288,494 B2 * | 10/2007 | Iwasaki et al. ............. 442/189 |

OTHER PUBLICATIONS

DuPont, Technical Guide-Kevlar Aramid Fiber, Apr. 2000.

* cited by examiner

*Primary Examiner*—Edward Lefkowitz
*Assistant Examiner*—Jermaine Jenkins
(74) *Attorney, Agent, or Firm*—Miller & Martin PLLC

(57) ABSTRACT

A wind sensor device consisting of a plurality of light weight, flexible, high tensile strength filaments attached to and depending from a malleable elongated body structure, such as a wire. The filaments are blown by the wind, thus indicating direction. The flexible body structure is used to attached the device to a hunter's rifle, gun, bow, tree, or other nearby object such as a branch, thus freeing the hunter's hands for other tasks.

34 Claims, 3 Drawing Sheets

HUNTING WIND SENSOR

FIELD OF THE INVENTION

The present invention relates generally to a device which indicates wind direction. The device consists of extremely durable high strength, low weight, flexible synthetic filaments, preferably formed from aramid fibers, which have high sensitivity to wind. When exposed to even a slight amount of wind, the filaments indicate wind direction by blowing in the direction of the wind. The device may be hand-held or attached to a rifle, bow or any other object for use in connection with hunting, golfing, sailing or any other activity which requires information on wind direction.

DESCRIPTION OF RELATED ART

Most game animals including deer, elk, antelope, mountain goats, sheep, wild boar, and bears have highly sensitive noses that are the animals' primary mechanism for detecting the presence of predators—including humans. To avoid detection, hunters employ a variety of products including scent-elimination clothing, scent-elimination soaps and sprays, and cover-up scents. The manufacturers of those products claim they are effective in reducing or covering human odor to an extent that game will not detect the presence of a hunter. Those claims are believed to be over-blown by many experienced hunters, although there is no way to actually prove or disprove them.

The only 100% effective way for a hunter to avoid detection of his scent is to be in a position where his scent will not be carried on the wind toward his prey. In practical terms, the hunter must remain downwind of his prey. As the wind passes a hunter, his scent is carried downwind in an expanding arch. This sector downwind from the hunter may be referred to as a "scent detection zone." In order for a mobile hunter to remain downwind of his prey and keep the animal out of his scent detection zone, or for a stationary hunter to know when his moving prey will enter the scent detection zone, the hunter must obviously know the direction in which the wind is blowing. Additionally, the location of the hunter's scent detection zone changes as wind currents shift. In practice, it is not unusual for the scent detection zone to move constantly. Therefore, it is advantageous to have a wind sensor which provides a constant and instantaneous determination of wind direction.

Wind gauges or sensors are valuable tools that help hunters determine the direction of the wind. Prior art wind gauges generally fall into one of three categories: powder dispensers, fiber dispensers and mechanical pointers. Powder dispensers dispense small quantities of powder substances into the air using a squeeze bottle similar to a nasal spray bottle. To determine wind direction, the user must manually squeeze a bottle releasing small quantities of powder substances into the air. By observing the direction in which the substance moves on the air, the user can determine wind direction. Powder dispenser wind gauges are disclosed in U.S. Pat. Nos. 4,423,626 and 5,186,118.

The second category of products designed to indicate wind direction consist of small fibers that float when released, usually milkweed down, stored in a storage device then pulled loose and released into the air by hand. Once the fibers have been released into the air, the user can determine wind direction by observing the direction of the fibers as they are pushed and carried on the air currents. These types of devices are described in U.S. Pat. Nos. 5,958,585, 6,550,418, 6,631,800 and 6,848,302.

Wind detection devices that require the hunter to release a substance into the air, such as powder and fiber dispensers are effective, however, they have a number of drawbacks. One problem with these devices is that they do not allow constant and instantaneous determination of wind direction. The wind direction information they provide is transitory, ending when the substance is dispersed, hits the ground or blows out of visual range. Furthermore, these devices require a free hand to grasp and physically release the substance. This is difficult to execute while operating a rifle, shotgun or bow, all of which require the use of both hands. Another problem with these devices is that the movement required to release the substance makes the hunter susceptible to visual or audible detection. Moreover, both powder dispensers and fiber dispensers employ products that are not reusable and are lost once dispensed into the air. Thus, these products may not be reused and must be constantly dispensed into the air because wind direction must be constantly monitored.

The final category of products designed to indicate wind direction are mechanical pointers. These devices are suspended in a manner such that wind currents move them in a direction opposite the origin of the wind. A prior art mechanical pointer device is described in U.S. Pat. No. 5,595,137.

Although mechanical pointers may be reused, unlike powder and fiber dispensers, mechanical pointers also have drawbacks. These devices are bulky and difficult to carry and use in hunting. Additionally, mechanical pointers are costly as a result of high manufacturing costs. Because of their weight, they are also difficult to attach to a hunter's weapon.

U.S. Pat. No. 5,291,778 discloses a hunting wind direction indicator which may be attached to a hunting weapon, such as a rifle or archery bow. The wind direction indicator contains a thread filament which will be blown to indicate wind orientation. However, as is evidenced by the inclusion of a spindle mounting a spool of thread filament, it was contemplated that the thread filament could be easily torn and lost during hunting and will need to be continually replaced. The filament of the invention shown in U.S. Pat. No. 5,291,778 may not be reused and must constantly be replenished.

Various do-it-yourself methods are also employed by some hunters to determine wind direction. For example, some hunters tie a typical household sewing thread, string or piece of yarn to their rifle, gun, or bow. By observing the direction of the thread, the user can determine wind direction. This method is often difficult to execute and does not always work because the thread or yarn must be very light and fine in order to be sensitive to even light wind. Fine household threads, string and yarn, however, are not sufficiently durable for reliable use in the rugged hunting environment. Thin threads and yarns are wind sensitive, however, they do not have a high tensile strength and often tear away while the hunter walks through woods and brush. As a result, the hunter must constantly manually replace worn or torn threads in order to maintain the ability to constantly monitor wind direction. Thick threads and yarns, while adding slight protection against breakage, are not as wind sensitive, and fail to adequately determine the direction of the wind.

Other do-it-yourself methods include lighting a match, lighter, or cigarette and observing the direction the wind blows the smoke or flame. These methods make the hunter susceptible to both visual and odor detection. Additionally, these methods may be dangerous to employ in the woods.

SUMMARY OF THE INVENTION

It is an object of the present invention to provide an airflow direction indicator or wind sensor device which provides constant and instantaneous determination of wind direction. Another object of the present invention is to provide a wind sensor device which is highly sensitive and detects even light wind.

Another object of the present invention is to provide a wind sensor device which is extremely durable. It is an object of the present invention to provide a durable yet highly sensitive wind sensor device for determining the direction of the wind.

Another object of the present invention is to provide a wind sensor device which is versatile and can be attached to any object, removed and re-attached an unlimited number of times.

Another object of the present invention is to provide a wind sensor device which is light and easily portable.

Another object of the present invention is to provide a wind sensor device which can be manufactured and sold at a low cost.

Another object of the present invention is to provide a wind sensor device which uses highly wind-sensitive, yet strong synthetic filaments constructed of aramid fibers to detect wind direction.

It is another object of the present invention to provide a wind sensor device having a vinyl-clad wire which may be used to attach the device to an object.

It is another object of the present invention to provide a packaged wind sensor device which may be easily transported, carried and stored.

It is another object of the present invention to provide a packaged wind sensor device which may be re-used again and again.

Another object of the present invention is to provide a device that can be hand-held using the protective case, or removed and attached to another object.

Accordingly, a presently preferred embodiment of the present invention provides a wind sensor device consisting of a plurality of light weight and durable filaments attached to a flexible material, such as a wire. The filaments are blown by the wind, thus indicating direction. The flexible wire is used to attach the device to a hunter's rifle, gun, bow, tree, or other nearby object such as a branch. Alternatively, the wind sensor device may be utilized while being held within a protective case, which case may be used as an extendable handle for holding by hand. Alternatively, the case may be used as a means for spacing the wind sensing filaments away from the user's body or the ground, or such other large object to which the case may be attached. This spacing can be meaningful for reducing the effect of wind turbulence on the sensor device caused by air flows over and around the object to which it is attached.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
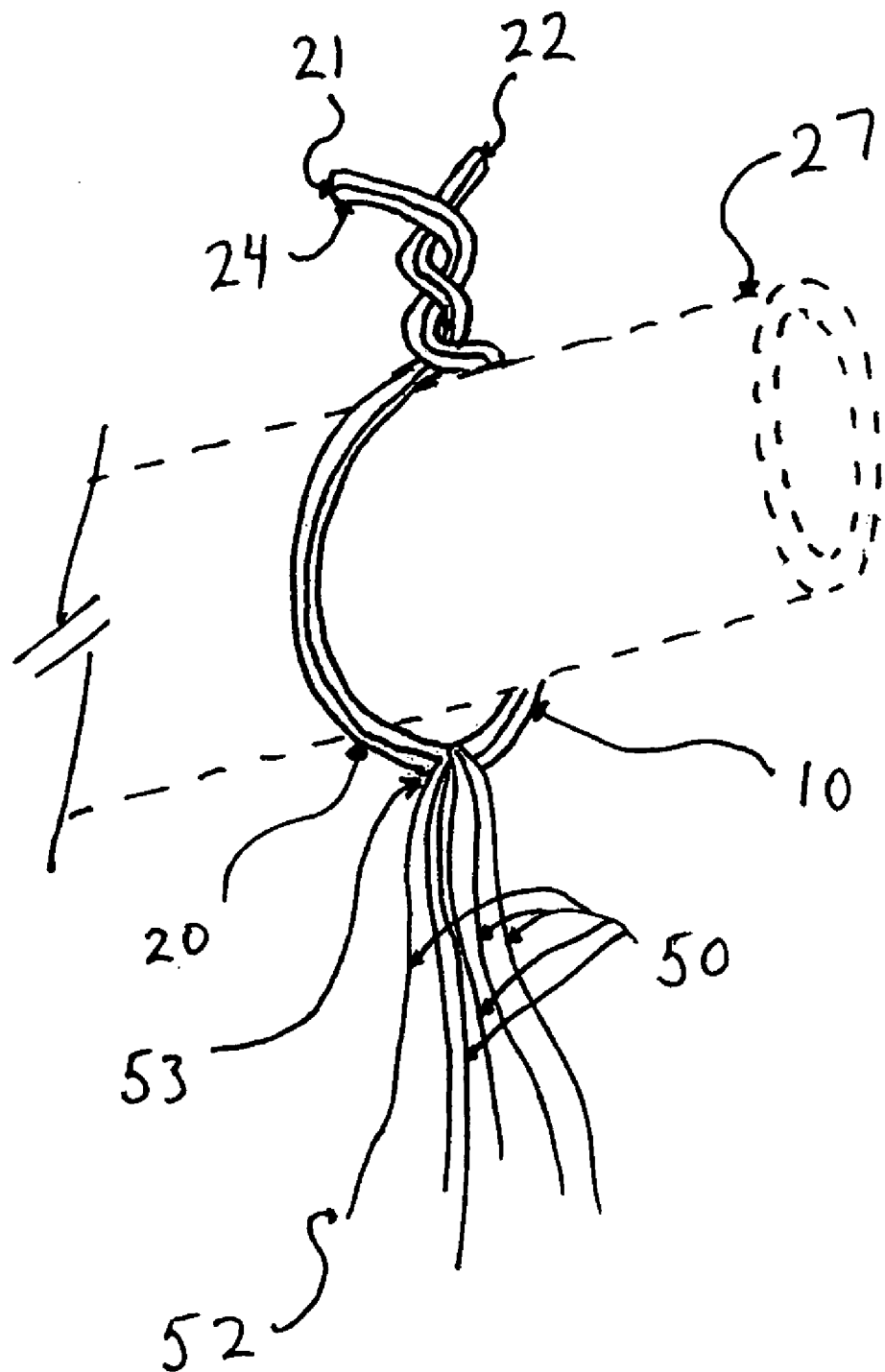
FIG. 1 is a perspective view of a presently preferred embodiment of the present invention as attached to a rifle barrel.

This invention teaches a hunting wind sensor or wind gauge for detecting the direction of the wind. FIG. 1 shows the wind sensor 10 having a plurality of thin, low weight, high tensile strength synthetic filaments 50 attached to and depending from an elongated body structure 20. In a preferred embodiment, the elongated body structure 20 comprises a malleable wire 20 having opposing ends 21 and 22. As shown in FIG. 1, wire 20 may be coated with a flexible outer coating such as clear vinyl coating 24. The synthetic filaments 50 may be attached to the body structure 20 in relatively close proximity to each other near the center of the body structure as shown in FIG. 1, or they may be spread out along the length of the body structure 20 as desired (not shown). For purposes of this invention, synthetic filaments 50 connected to the body structure 20 in relatively close proximity may be considered to be within about one quarter inch or a centimeter. Preferably the synthetic filaments 50 are affixed to the body structure 20 in such close proximity that they appear to be affixed at substantially the same point.

As shown in FIG. 1, the body structure 20 may be attached to an object such as rifle barrel 27 by fastening or wrapping the body structure 20 around the barrel 27 and twisting or otherwise tying the opposing ends 21, 22 together.

The synthetic filaments 50 of the present invention are extremely thin, having a diameter measuring between about 9 microns to about 20 microns, yet they are also highly flexible (not stiff) so that the synthetic filaments 50 achieve the desired sensitivity to even slight breezes. In other words, the synthetic filaments 50 must be thin enough and flexible enough to react to even negligible breezes. Additionally, however, the synthetic filaments 50 must be strong enough not to rip or tear when subjected to the rigorous environment of hunting equipment.

The terms tenacity and tensile strength may be defined as the ultimate strength exhibited by a material at the moment of failure based on a unit of the original (i.e., no load) cross section. In other words, tensile strength measures the force required to pull a linear object, such as a rope, wire, filament or structural beam, to the point where it breaks. Tensile strength is measured in units of force per unit area, the unit of measurement may be in newtons per square meter ($N/m^2$) (also known as pascals (Pa)) or in pounds per square inch ($lb/in^2$)(also known as PSI). The synthetic filaments 50 of the present invention have a high tensile strength, having a breaking tenacity over about 350,000 PSI (2760 MPa).

The synthetic filaments 50 of the present invention are preferably constructed of aramid fibers because such fibers are known to meet the generally preferred criteria for flexibility and high tensile strength at relatively fine deniers. Other synthetic filaments may be suitable if the material satisfies the desired characteristics.

In the preferred embodiment, the flexible, low-weight, high tensile strength synthetic filaments 50 are KEVLAR® brand para-aramid fibers. KEVLAR® brand synthetic filaments 50 may be obtained from E.I. du Pont de Nemour & Co. of Wilimington, Delaware. KEVLAR® aramid fibers are fibers of poly-para-phenylene terephthalamide.

KEVLAR® brand filaments 50 are known for their remarkable strength, yet are also flexible and low weight, having a density of about 1.44 g/cm³. The KEVLAR brand filaments preferred in the present invention are formed from a single thread or yarn of commercially available KEVLAR® brand yarn. KEVLAR® yarns are available in sizes ranging from 200 to 3000 denier. Two hundred denier KEVLAR® yarn is comprised of approximately 133 individual KEVLAR® filaments. KEVLAR® 29 size yarn is 1500 denier and has approximately 1000 individual filaments. KEVLAR 49 size yarn is 1140 denier and has approximately 768 individual filaments. Three thousand denier KEVLAR yarn has approximately 2000 individual filaments. Individual KEVLAR® filaments have a diameter of approximately 12 microns.

KEVLAR® filaments 50 are light-weight and flexible enough to react to slight air movements. The preferred KEVLAR® brand filaments 50 have a breaking tenacity of between about 424,000 (2920 MPa) to about 435,000 PSI (3000 MPa). These preferred KEVLAR® filaments 50 are obtained by separating 1500 and 1140 denier KEVLAR® yarns into their individual filaments. In the manufacturing of the present invention, a single KEVLAR® yarn may be attached to the body structure 20 before being cut to the desired length and the individual filaments 50 substantially separated out from the single KEVLAR® yarn. While the use of additional KEVLAR® yarns is within the contemplation of this invention, it has been found that a single yarn is sufficient for the intended purposes and helps keep manufacturing costs low.

As employed in the present invention, KEVLAR® brand filaments 50 are particularly well suited because they are strong, having a much higher tensile strength than other common yarns or plastic filaments, and can withstand the rough handling conditions of hunting. They withstand, without significant damage, the abuses normally encountered in hunting, including being tangled in weeds, briars, or the hunter's clothing or gear. Furthermore, they are not detrimentally affected by moisture or the range of temperatures normally encountered in even the most extreme of hunting environments.

KEVLAR® brand filaments 50 are extremely fine or thin which makes them acutely sensitive to even slight air movements while retaining significant strength. Preferably each individual aramid filament 50 utilized in the present invention measures between about 9 to about 20 microns in diameter, most preferably between about 10 microns to about 15 microns in diameter. Aramid filaments having a diameter less than about 20 microns are suitable for use in the present invention, though filaments within the preferred range specified above are most suitable because their flexibility is more reactive to air movements.

The aramid yarn from which the synthetic filament 50 of the present invention are formed is preferably is not twisted during the manufacturing process so that the individual filaments 50 tend to separate from one another after the tip 52 has been cut. Once separated, the individual synthetic filaments 50 are much more sensitive to the wind than filaments from a yarn that was originally twisted or wound. The individual filaments 50 used in the present invention also have a very high surface area to mass ratio which makes them extremely sensitive to even a minute amount of wind.

In addition to KEVLAR® brand fibers, aramid fibers within the group of suitable aramid fibers include TWARON® brand fibers and TECHNORA® brand fibers, both of which are manufactured by Teijin Twaron B.V. Ltd of Arnhem, Netherlands. Both are low-weight aramid fibers having suitably high tensile strength and flexibility for use in the present invention. TWARON® brand aramid fibers are fibers of poly-para-phenylene terephthalamide. TECHNORA® brand aramid fibers are fibers of co-poly-(paraphenylene13,4'-oxydiphenylene terephthalamide). Other aramid fibers having the claimed characteristics are also suitable for use in the present invention.

In the preferred embodiment, the synthetic filaments 50 are a bright color, either the natural yellow of KEVLAR® filaments, or dyed a bright color to contrast with the browns and greens typical in woodland settings.

Another suitable high tensile strength synthetic filament are high strength polyethylene fibers, such as ultra-high molecular weight SPECTRA® brand polyethylene fibers marketed by Honeywell International of Morris Township, N.J. High tensile strength polyethylene fibers are low-weight, low density and flexible, yet have a breaking tenacity in excess of about 350,000 PSI. However, polyethylene fibers are not presently preferred due to their resistance to chemical bonding agents and the resulting difficulty in manufacturing using polyethylene fibers.

Because of the very fine or thin nature of the filaments 50, to be effective, a sufficient number of filaments 50 must be used in order to be easily visible to the naked eye. However, it is less desirable to use too large of a number of filaments 50 in order to avoid creating a large, brightly colored mass that would be more likely to draw the attention of the prey. Furthermore, the weight of too many filaments 50 bunched together could inhibit the overall effectiveness of the filaments in being moved by slight air movements. Preferably, the present invention comprises the filaments 50 from one or more aramid yarns, most preferably from a single aramid yarn, i.e., between 500 and 1500 filaments, most preferably between 700 and 800 filaments 50.

The length of the synthetic filaments 50 depending from the body structure 20 is preferably between about 1.0 inches (2.5 cm) to about 5 inches (13 cm), most preferably between about 2.5 inches (6 cm) to about 3.5 inches (9 cm). Synthetic filaments 50 shorter than the preferred length are within the contemplation of the present invention, but are less preferable as such filaments may tend to be rather stiff or bristly due to their short length. Synthetic filaments 50 longer than the preferred length are also certainly within the variations contemplated in the present invention, but the weight of such longer synthetic filaments 50 may again tend to decrease the ability of the synthetic filament 50 to give an adequate reaction to the presence of softly moving air, thereby decreasing the effectiveness of the wind sensor for its intended purpose.

In the preferred embodiment, an approximately 3.5 inch section (about 9 cm) of 1140 denier KEVLAR® brand yarn is secured at the base end 53 to an approximately 6 inch section (16 cm) of an elongated body structure 20, such as malleable wire 20. When the yarn is separated, this results in individual synthetic filaments 50 having a length of about 3.25 inches (about 8.25 cm) measured from the body structure 20 or base end 53 of a filament 50 to the tip 52 of a filament 50. For maximum utility, the base end 53 of the synthetic filaments 50 are preferably attached substantially near the middle third of the body structure 20, though attachment at any point along the body structure 20 is possible.

Wire 20 may be formed of any malleable material exhibiting a high degree of structural plasticity. Suitable malleable material gives the body structure 20 the desired combination of flexibility and rigidity so that it may be easily wrapped by hand around a portion of the object, such as rifle barrel 27, to which it will be attached and retain that form when released, thereby remaining attached to the object. The malleable material of the wire 20 is bendable to assume various configurations so as to facilitate repeated use without breakage.

In one preferred embodiment, the body structure 20 further comprises a flexible outer coating, such as vinyl coating 24 on the wire 20. The vinyl cladding or other flexible outer coating 24 prevents rusting of the wire 20 and scratching of the item to which it is attached. The outer coating 24 is also textured to provides a secure grip on smooth surfaces as compared to a metal wire. Vinyl-clad floral wire is preferred because it allows the user to easily attach the device to a hunting bow, rifle, tree stand, tree limb, or other nearby object. The vinyl coating 24 may be clear as illustrated in FIG. 1, or of any desired color.

The elongated body structure 20 is preferably about 6 to about 8 inches in length (15 to 20 cm) from end 21 to end 22. This length gives the body structure 20 sufficient length to allow it be removeably wrapped or twisted around a rifle or shotgun barrel 27, a bow stabilizer (not shown), a tree stand (not shown), a nearby tree limb (not shown), or any other suitable point of attachment. Shorter and longer body structures 20 are certainly within the scope of the claimed invention, and the length and width of the body structure 20 may be tailored to the particular desired application or use.

The synthetic filaments 50 are preferably attached to the body structure 20 or bendable wire by wrapping the base end 53 of each synthetic filament 50 around the body structure 20 and securing the synthetic filaments 50 in place by tying a knot (not shown). The knot is then secured in place with liquid glue, plastic or the application of the outer coating 24. Any other appropriate attachment means may be used to attach the synthetic filaments 50 to the wire 20, including, clamping, pinning or molding.

Figure 2:
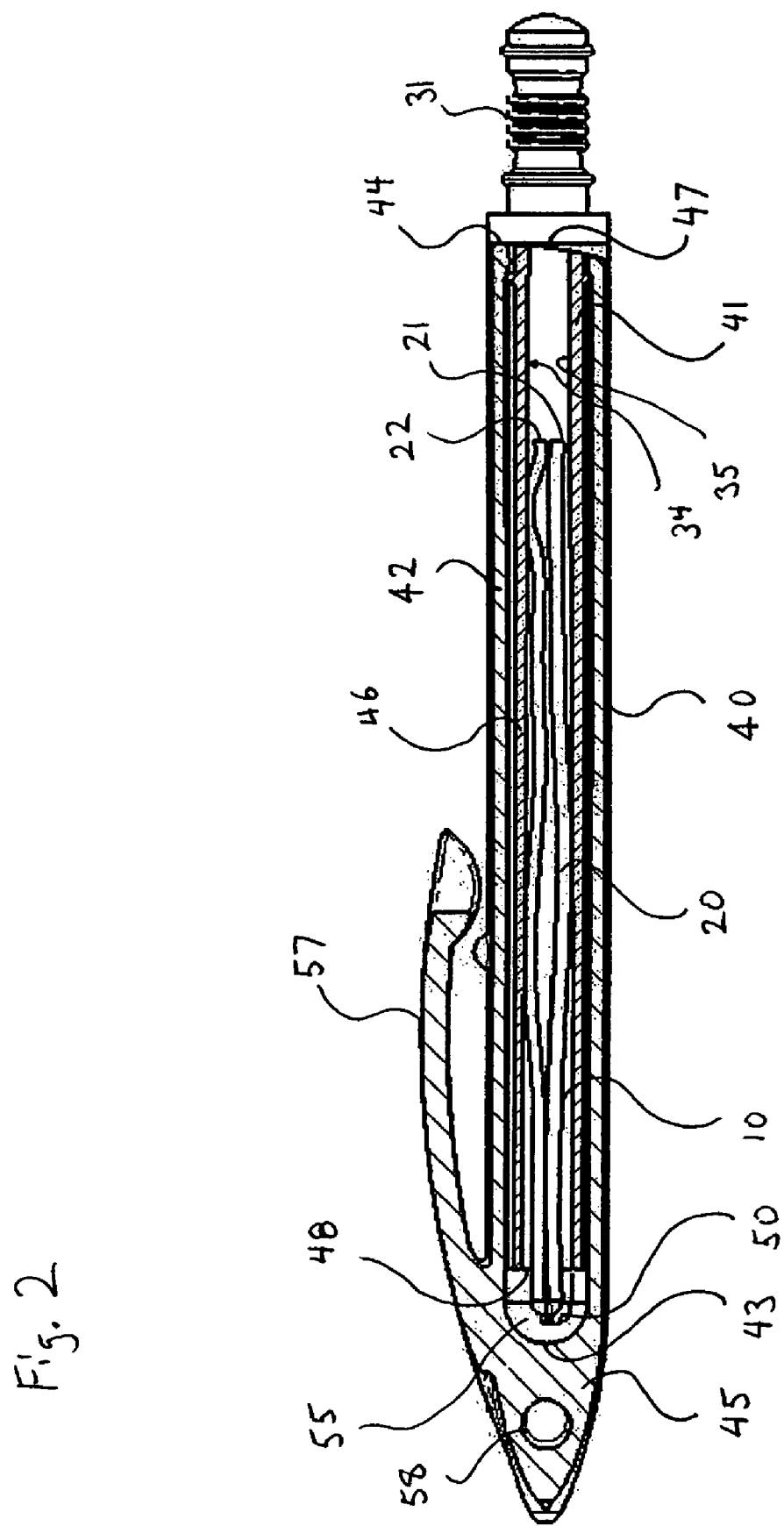
FIG. 2 is a cross sectional view of a presently preferred embodiment of the present invention as encapsulated in a storage container.

FIG. 2 is a cross sectional view of the wind sensor 10 enclosed in a generally cylindrical storage container 40 adapted to contain the wind sensor 10. The storage container 40 has complementary joining members, such as outer body 45 and inner case 41. The outer body 45 has an elongated cylindrical wall 42 with a closed bottom 43 and an open top 44. The inner case 41 also has an elongated cylindrical wall 46 with a closed bottom 47 and an open top 48. The open top 44 of the outer body 45 has a diameter slightly larger than the diameter of the open top 48 of the inner case 41 such that when in a closed joining configuration, the open top 44 of the outer body 45 fits snugly over the open top 48 of the inner case 41, allowing a portion of the cylindrical wall 42 of the outer body 45 to slide around a portion of the cylindrical wall 46 of the inner case 41, thereby creating a containing space 55 within which to fully enclose and retain the wind sensor 10 within the storage container 40. This closed joining configuration allows the wind sensor 10 to be carried when not in use without the risk of damage to the synthetic filaments 50 or wear on the body 20.

Either or both of the complementary joining members 41 or 45 of the storage container 40 may further comprise means for releasably retaining the wind sensor 10 within a joining member 41 or 45. In a preferred embodiment, the elongated cylindrical wall 46 of inner case 41 itself serves as the means for retaining the wind sensor 10. As shown in FIG. 2, the opposing sides 34, 35 of cylindrical wall 46 are spaced close enough together to provide a frictional touching relation between the body structure 20 and the wind sensor 10 such that when inside the containing space 55, the wind sensor 10 is held in place unless forceably withdrawn by the user. In practice, attachment and reattachment of the wind sensor 10 to various objects during use results in multiple small variations in the malleable body structure 20 so that it is rarely perfectly flat, but rather, has bends, angles and other deformations which provide additional points of contact with the circular wall 46, thereby assisting in retaining the wind sensor 10 within the inner case 41.

Alternatively, means for releasably retaining the wind sensor 10 may be inwardly-pinched deformations (not shown) or inwardly pointing projections (not shown) in the circular wall 46, or clay or putty or some other pliable material (not shown) positioned at the closed bottom 47 of inner case 41 into which an end 21, 22 of the body structure 20 may be pushed.

Figure 3:
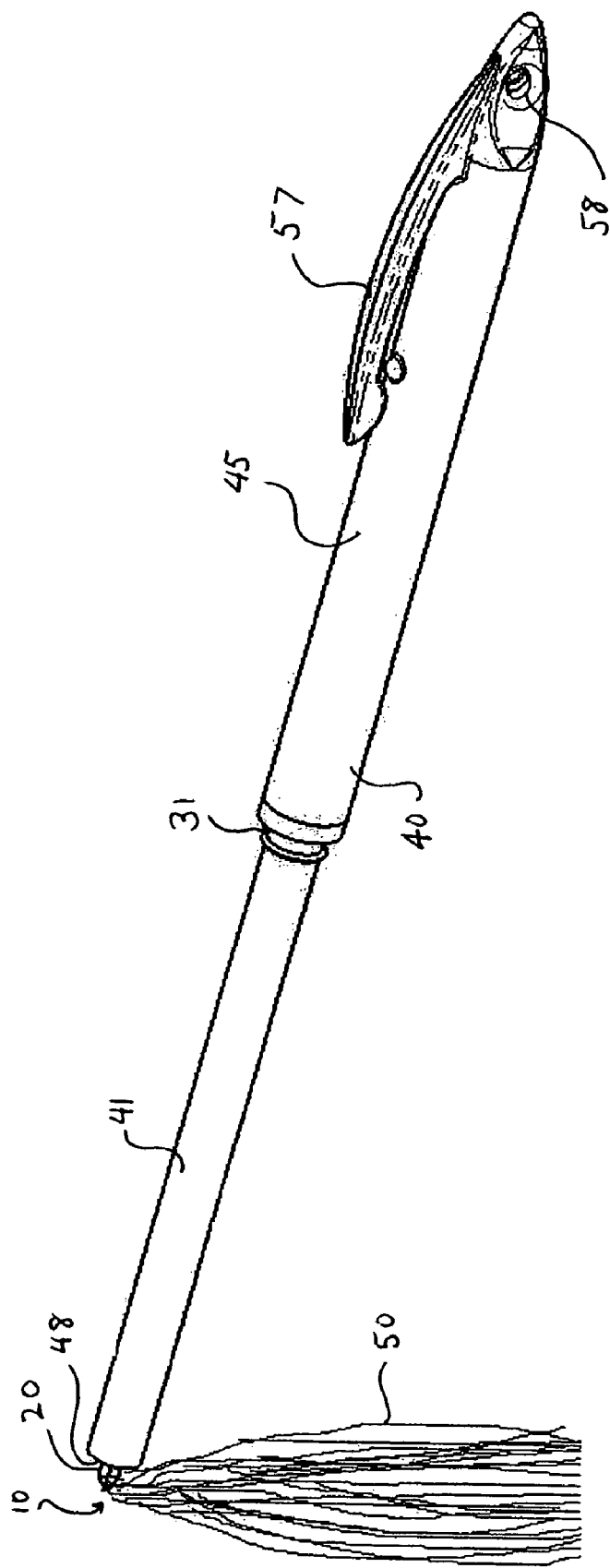
FIG. 3 is a perspective view of the storage container and wind sensor device in a configuration for being held by hand.

Closed bottom 47 of inner case 41 may further comprise gripping surface 31 opposite the open top 48 of inner case 41. As shown in FIG. 3, gripping surface 31 is sized to securely engage with or snap into the open top 44 of outer body 45 when inner case 41 is withdrawn from outer body 45 and reversed in what may be referred to as a second, open joining configuration. With at least one end 21 or 22 (not shown) of the body structure 20 affixed by retaining means 38 (not shown) within a joining member (in this case, inner case 41), the storage container 40 may be utilized as a holder for the wind sensor 10 by dangling the filaments 50 from the open top 48.

Alternatively, and in the more ordinarily contemplated use, the wind sensor 10 may be completely removed from the storage container 40 prior to use and attached to a desirable object such as a rifle, bow, tree stand or a branch as shown in FIG. 1.

Returning to FIGS. 2 and 3, the storage container 40 is preferably formed of a plastic, clear plastic, wood or other suitable material. The storage container 40 capable of enclosing the wind sensor 10 is preferably small enough to fit in one's pocket like a writing pen. The storage container 40 may also be fitted with a holding device such as a pen-like pocket clip 57 or eyelet 58 through which a chain, strap or other cord (not shown) may be passed.

The wind sensor 10 of the present invention has significant advantages over existing products. The wind sensor 10 of the present invention allows constant and instantaneous determination of wind direction and scent detection zone. It does not require the hunter who is operating a rifle, shotgun or bow to grasp and release a substance or manipulate the sensor in any way. Moreover, because the wind sensor 10 of the present invention does not require any movement, noise or odor from the hunter, the hunter is less likely to be detected by his prey.

The KEVLAR® filaments 50 used in the present invention have a high surface area to mass ratio making them extremely sensitive to light wind. Because the filaments 50 are aramid fibers, they are also extremely durable. Under regular hunting conditions, the filaments 50 can last numerous hunting seasons. If the filaments 50 become tangled with briars, burrs, or themselves, they can usually be easily straightened out by pulling them with the fingers or a small brush. Because the body structure 20 is made of a malleable wire, the wind sensor 10 of the present invention can also be repeatedly attached, removed, and re-attached a virtually unlimited number to times.

The present invention also has advantages over prior mechanical pointing devices because the use of flexible, high tensile strength, low weight synthetic filaments 50 allows simplicity in design and manufacture which results in significantly lower cost to the user. The ability of the body structure to bend in order to attach the device to a variety of differently shaped objects, including, but not limited to, hunting bows, rifles, shotguns, muzzleloaders, tree stands, tree limbs, and bushes, is another significant advantage over prior art mechanical pointing devices.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:

1. A device for indicating airflow direction comprising an elongated body structure having a plurality of high tensile strength synthetic filaments, wherein the synthetic filaments are aramid fibers selected from the group consisting of fibers of poly-paraphenylene terephthalamide, and fibers of co-poly-(paraphenylene1 3,4'-oxydiphenylene terephthalamide).

2. The device for indicating airflow direction of claim 1 wherein the synthetic filaments have a breaking tenacity over about 350,000 PSI.

3. The device for indicating airflow direction of claim 1 wherein the plurality of synthetic filaments are connected to the elongated body structure in relatively close proximity to each other.

4. The device for indicating airflow direction of claim 1 wherein the elongated body structure is formed from a malleable material.

5. The device for indicating airflow direction of claim 1 wherein the elongated body structure further comprises a malleable outer coating.

6. The device for indicating airflow direction of claim 1 wherein the synthetic filaments have a high surface area to mass ratio.

7. The device for indicating airflow direction of claim 1 wherein the synthetic filaments have a diameter measuring between about 10 microns to about 15 microns.

8. A device for indicating airflow direction comprising an elongated body structure having a plurality of high tensile strength synthetic filaments, wherein the synthetic filaments are formed by attaching a single aramid yarn to the body structure and substantially separating the single aramid yarn into its constituent synthetic filaments.

9. A device for indicating airflow direction comprising an elongated body structure having a plurality of high tensile strength synthetic filaments and a storage container comprising complementary joining members into which the device for indicating airflow direction is inserted, the joining members forming a containing space capable of enclosing the device for indicating airflow direction when in a closed joining configuration.

10. The device for indicating airflow direction of claim 9 wherein the joining members are capable of being joined in a second, open joining configuration wherein the body structure is held within one of the joining members by a retaining means and the synthetic filaments dangle out of an open top of one of the joining members.

11. The device for indicating airflow direction of claim 9 wherein the storage container further comprises a holding device.

12. A device for indicating airflow direction comprising a body structure formed of a malleable material exhibiting sufficiently high plasticity wherein the body structure is bendable to retain a plurality of configurations and a plurality of synthetic filaments affixed to the body structure, wherein the synthetic filaments have a breaking tenacity over about 350,000 PSI.

13. The device for indicating airflow direction of claim 12 wherein the synthetic filaments are aramid fibers.

14. The device for indicating airflow direction of claim 12 wherein the synthetic filaments are affixed to the body structure in relatively close proximity to each other.

15. The device for indicating airflow direction of claim 12 wherein the body structure further comprises a flexible outer coating.

16. The device for indicating airflow direction of claim 12 wherein the synthetic filaments are aramid fibers selected from the group consisting of fibers of poly-paraphenylene terephthalamide, and fibers of co-poly-(paraphenylene1 3,4'-oxydiphenylene terephthalamide).

17. The device for indicating airflow direction of claim 12 wherein the synthetic filaments have a high surface area to mass ratio.

18. The device for indicating airflow direction of claim 12 wherein the synthetic filaments have a diameter measuring between about 10 microns to about 15 microns.

19. The device for indicating airflow direction of claim 12 wherein the synthetic filaments are formed by attaching a single aramid yarn to the body structure and substantially separating the single aramid yarn into its constituent synthetic filaments.

20. The device for indicating airflow direction of claim 12 further comprising a storage container comprising complementary joining members into which the device for indicating airflow direction may be inserted, the joining members forming a containing space capable of enclosing the device for indicating airflow direction when in a closed joining configuration.

21. The device for indicating airflow direction of claim 20 wherein the joining members are capable of being joined in a second, open joining configuration wherein the body structure is held within one of the joining members by a retaining means and the synthetic filaments dangle out of an open top of one of the joining members.

22. The device for indicating airflow direction of claim 20 wherein the storage container further comprises a holding device.

23. A device for indicating airflow direction comprising:
(a) an elongated body structure formed of a malleable material exhibiting sufficiently high plasticity wherein the elongated body structure is bendable to retain a plurality of configurations; and
(b) a plurality of synthetic filaments affixed to the body structure in relatively close proximity each other.

24. The device for indicating airflow direction of claim 23 wherein the synthetic filaments have a high tensile strength.

25. The device for indicating airflow direction of claim 24 wherein the synthetic filaments have a breaking tenacity over about 350,000 PSI.

26. The device for indicating airflow direction of claim 23 wherein the synthetic filaments are aramid fibers.

27. The device for indicating airflow direction of claim 23 wherein the synthetic filaments are aramid fibers selected from the group consisting of fibers of poly-paraphenylene terephthalamide, and fibers of co-poly-(paraphenylene1 3,4'-oxydiphenylene terephthalamide).

28. The device for indicating airflow direction of claim 23 wherein the synthetic filaments have a high surface area to mass ratio.

29. The device for indicating airflow direction of claim 23 wherein the synthetic filaments have a diameter measuring between about 10 microns to about 15 microns.

30. The device for indicating airflow direction of claim 23 wherein the body structure further comprises a flexible outer coating.

31. The device for indicating airflow direction of claim 23 wherein the synthetic filaments are formed by attaching a single aramid yarn to the body structure and substantially separating the single aramid yarn into its constituent synthetic filaments.

32. The device for indicating airflow direction of claim 23 further comprising a storage container comprising complementary joining members into which the device for indicating airflow direction may be inserted, the joining members forming a containing space capable of enclosing the device for indicating airflow direction when in a closed joining configuration.

33. The device for indicating airflow direction of claim 32 wherein the joining members are capable of being joined in a second, open joining configuration wherein the body structure is held within one of the joining members by a retaining means and the synthetic filaments dangle out of an open top of one of the joining members.

34. The device for indicating airflow direction of claim 32 wherein the storage container further comprises a holding device.

\* \* \* \* \*